United States Patent

Kelly

[11] Patent Number: 5,805,340
[45] Date of Patent: Sep. 8, 1998

[54] OPTICAL MODULATOR AND SYSTEM HAVING TUNABLE IMAGE ENHANCEMENT

[75] Inventor: Shawn L. Kelly, 8479 Pine Cove Dr., Commerce Township, Mich. 48382

[73] Assignee: Shawn L. Kelly, Commerce Township, (Oakland County), Mich.

[21] Appl. No.: 754,148

[22] Filed: Nov. 22, 1996

[51] Int. Cl.⁶ ...................................................... G02B 5/18
[52] U.S. Cl. ........................... 359/574; 359/629; 359/837
[58] Field of Search ................................... 359/629, 574, 359/573, 837, 569

[56] References Cited

U.S. PATENT DOCUMENTS

| | | | |
|---|---|---|---|
| 2,189,751 | 2/1940 | Bocca et al. | 359/574 |
| 5,054,884 | 10/1991 | Kubota | 359/629 |
| 5,337,181 | 8/1994 | Kelly | 359/574 |
| 5,442,787 | 8/1995 | Steiner | 359/629 |

*Primary Examiner*—Frank G. Font
*Assistant Examiner*—Reginald A. Ratliff
*Attorney, Agent, or Firm*—Lyon, P.C.

[57] ABSTRACT

An optical modulator (19) utilizes a variable beam splitter arrangement having two separate plano-periodic cylindrical lens arrays (20 and 22) arranged as a sandwiched air-spaced assembly with the plano surfaces facing outwardly from the assembly. The assembly further includes a means (26) for controllably translating or moving one of the lenses relative to the other. The periodic array is formed as alternating concave and convex cylindrical structures. In a nominal setting, the optical axes of the concave structures of one of the lens arrays are aligned with the optical axes of the convex structures of the other so that the assembly acts as an afocal window having little impact when placed in an optical system. To adjust the beam splitting properties, one lens array is slightly translated with respect to the other to cause controlled misalignment of the two lens array surfaces. The present invention is particularly suited for tuning the point spread function of an electronic imaging system.

14 Claims, 2 Drawing Sheets

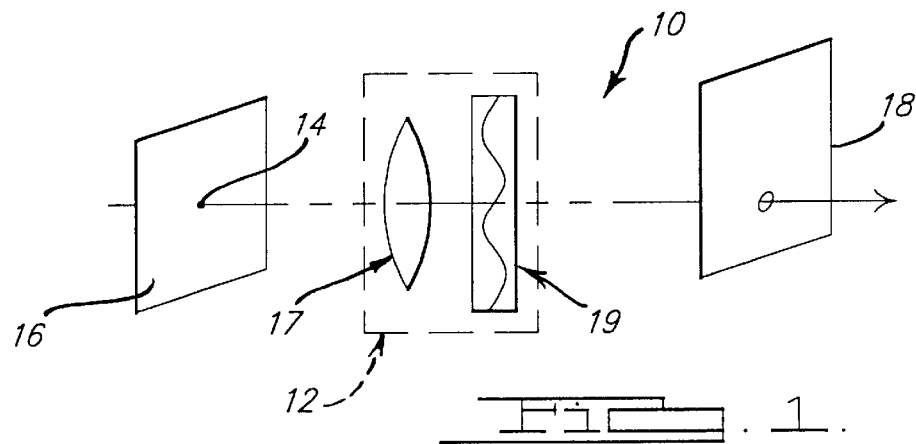
FIG. 1.
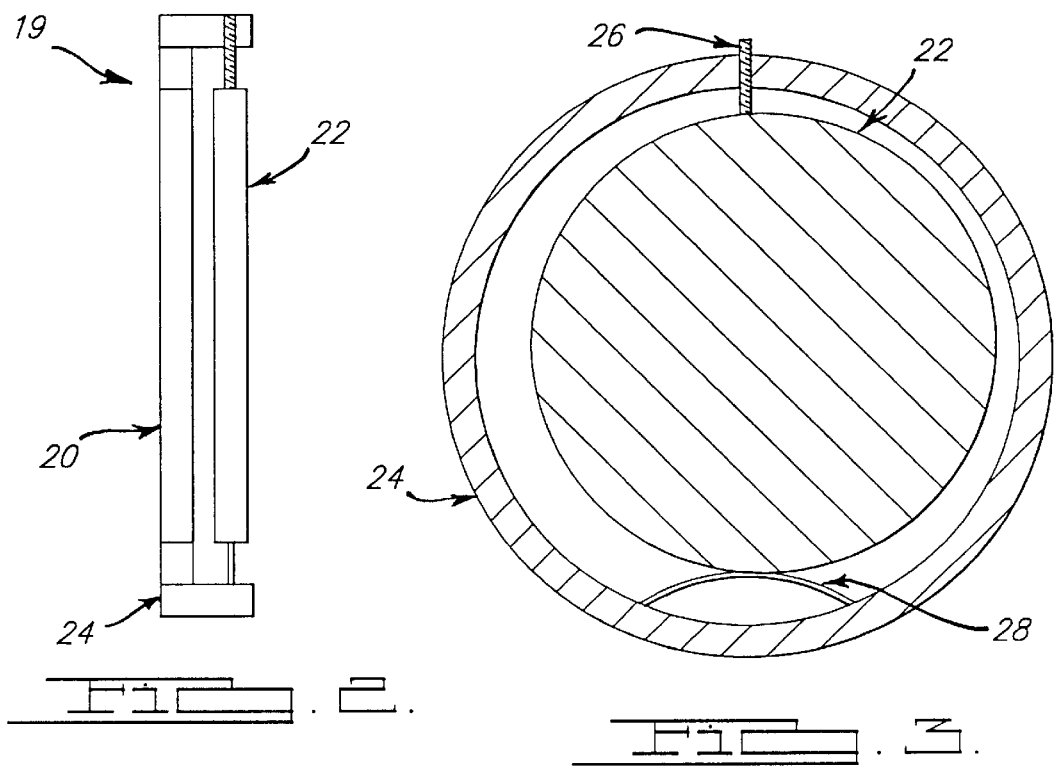
FIG. 2.
FIG. 3.
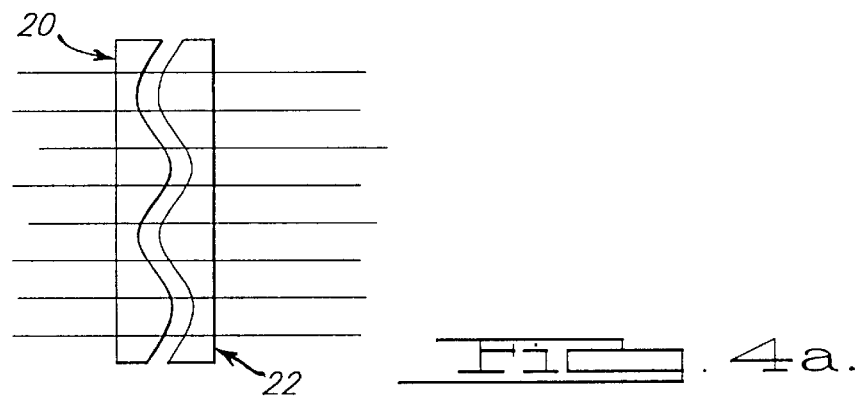
FIG. 4a.

OPTICAL MODULATOR AND SYSTEM HAVING TUNABLE IMAGE ENHANCEMENT

BACKGROUND OF THE INVENTION

The present invention generally relates to improvements in beam splitters and optical imaging systems, and more particularly to a modulating system and method which is capable of increasing image fidelity by removing or altering artificial pixel or line structures in an optically formed image.

In general, spatial filtering or spatial frequency modulation has been employed for many years to remove or reduce the appearance of artificial pixel or line structures in television, computer, electronic camera, and half-tone images, which structures otherwise decrease overall image fidelity. In the specific case where images are comprised of many dots or lines, this spatial modulating is most commonly implemented by splitting the image into two components and slightly shifting them relative to each other to blend these structures. In terms of image processing, such an approach effectively modulates the spatial frequency spectrum of the image with a cosine function to suppress the harmonic frequencies of the generally repetitive artificial structures of the camera or display. In a camera system, this results in improved color fidelity as well as a general reduction in aliasing and moiré effects. In a display system, this results in the general expansion of discrete line and picture elements to form a more seamless, solid look.

For optical image modulation to be practical it must result in minimum impact on the conventional optical system of the imaging device. This is commonly achieved with a thin optical modulator component having a fixed, repeating, triangular-wave surface structure formed thereon, wherein the amount of image splitting is dependent on the structure's alternating slopes.

While such arrangements constitute a certain amount of improvement in image fidelity, modulator arrangements using triangular and other fixed-structure image modulators suffer from the drawback that they require expensive tooling for each design. Since each imaging system may conceivable require a different amount of modulation, accommodating the diverse imaging industry with a full range of modulators represents an unwarranted tooling expense. In addition, many imaging systems employ a zoom lens which can directly effect the amount of splitting required, significantly diminishing the benefit of modulation with any departure from the single optimum configuration.

SUMMARY OF THE INVENTION

In accordance with a first aspect of the present invention, an optical modulator component which overcomes the above-noted problems is provided with a variable beam splitter having two separate plano-periodic cylindrical lens arrays or light modifying equivalents thereof arranged as a sandwiched air-spaced assembly with plano surfaces facing outwardly from the assembly. In accordance with a preferred embodiment, the assembly further includes a means for controllably translating or moving the lenses relative to each other in a single direction orthogonal to both the cylindrical axes and the optical axes of the lenses. The periodic array comprises alternating concave and convex cylindrical structures of identical curvatures. In a nominal setting, the optical axes of the concave structures of one lens array are aligned with the optical axes of the convex structures of the other lens array so that the assembly acts as an afocal window having little impact when placed in an optical system. To adjust the beam splitting and modulating qualities, one lens array is slightly translated with respect to the other so that any incident light passing through the modulator is split due to the misalignment of the two lens array surfaces.

In accordance with another aspect of the present invention, a system for adjusting or modifying a point spread function to increase the fidelity of an optically formed image comprises an optical modulator positioned along an optical axis, wherein the optical modulator comprises two separate plano-periodic cylindrical lens arrays or equivalents thereof arranged as a sandwiched air-spaced assembly with plano surfaces facing outwardly from the assembly, and a means for controllably translating or moving the lenses relative to each other in a single direction orthogonal to the optical axis. The amount of translation of one lens relative to the other provides an adjustable point spread function which can be precisely tuned.

In accordance with yet another aspect of the present invention, a variable beam splitter comprises a first optical element having a lens array comprising alternating convex and concave light modifying structures formed on a surface thereof, and a second optical element having a lens array comprising alternating convex and concave light modifying structures formed on a surface thereof. The lens array of the second optical element is positioned adjacent to the lens array of the first optical element. Further, the first and second optical element are positioned so that the respective lens arrays oppose each other, and the light modifying structures are oriented relative to each other so as to split an incident light beam passing through the first and second optical elements. In accordance with a preferred embodiment, a means is provided for selectively translating the second element relative to the first element so as to control the splitting of any incident light beam passing therethrough.

The present invention will be more fully understood upon reading the following detailed description of the preferred embodiment in conjunction with the accompanying drawings.

BRIEF DESCRIPTION OF THE DRAWINGS

FIG. 1 is a schematic representation of an electronic imaging system in accordance with the present invention;

FIG. 2 is a side view of an optical modulator in accordance with the present invention;

FIG. 3 is a frontal view of the optical modulator assembly shown in FIG. 2; and

DETAILED DESCRIPTION OF THE PREFERRED EMBODIMENT(S)

Figure 4B:
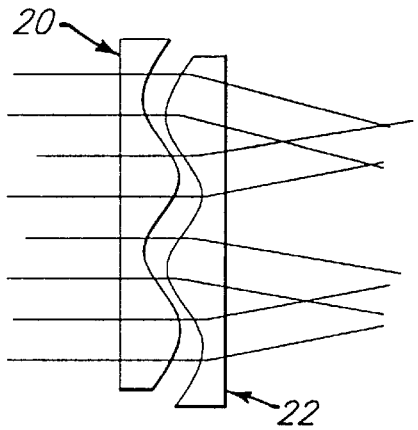
FIGS. 4(a) and (b) are side views of a pair of plano-periodic cylindrical lens arrays illustrating the operation of the present invention.

FIG. 1 shows a representative configuration of an electronic imaging system 10 which comprises an optical imaging subsystem 12 for reimaging an object 14 in an object plane 16 at an image plane 18. The imaging subsystem 12 comprises an imaging component 17, such as a lens, and an optical filter/modulator 19 which is described more fully hereinbelow. One of ordinary skill in the art will readily appreciate that the imaging component 17 can be implemented to utilize any simple or complex arrangement of optical elements to form an image at the image plane 18 of any object in the object plane 16, and that the choice of optical element used in conjunction with the optical modulator 19 is a design consideration made in appreciation of the foregoing description. The object plane 16 or the image plane 18 may be either close to or far from the optical imaging subsystem 16, as may be appropriate for a given application.

In accordance with the present invention, as shown in FIGS. 2–4, optical modulator 19 is formed from a first plano-periodic cylindrical lens array 20 and a second plano-periodic cylindrical lens array 22 arranged as a sandwiched air-spaced assembly with the respective plano surfaces facing outwardly from the assembly. In practice, these periodic structures and the air space are very small and barely noticeable in an actual device, however the dimensioning has been exaggerated for illustration and understanding of the present invention.

The modulator assembly 19 is located within a housing 24, and further includes at least one set screw 26 accessible from the exterior of the housing 24 and in contact with one of the lens arrays 20 or 22. The other lens array is affixed in a stationary position to the housing 24. Set screw 26 operates in conjunction with a biasing member positioned on the opposite side of the affected lens array, such as tensioning wire 28, so as to provide a means for controllably translating or moving one of the lenses relative to the other in a single direction orthogonal to both the cylindrical axes and the optical axes of the lenses.

While a set screw 26 and biasing element 28 have been shown as part of a preferred embodiment, one of ordinary skill in the art will readily appreciate that such an arrangement is not to be construed as limiting and that other arrangements may be suitable for controllably translating the lens arrays relative to each other without departing from the present invention. The choice of such alternate arrangements would be a design consideration made in appreciation of the cost and application of the optical modulator of the present invention.

As best seen in FIGS. 4(a) and (b), each periodic array comprises a series of alternating concave and convex cylindrical structures of identical curvatures. The operation of the optical modulator/beam splitter of the present invention is understood by first assuming that since the air space is very small, any light ray passing through the alternating surface of the first lens array 20 also passes through the alternating surface of the second lens array 22 at approximately the same vertical location.

In a nominal setting shown in FIG. 4(a), the optical axes of the concave structures of lens 20 are aligned with the optical axes of the convex structures of lens 22 so that the assembly operates as an afocal window having little impact when placed in the optical system 10. More specifically, in accordance with known principles of optics, any ray passing through an arbitrary vertical position on the first alternating surface will remain undeviated as it leaves the second alternating surface. Due to the parallel alignment of the outside surfaces of the respective lens arrays, the modulator in this nominal configuration will therefore act substantially as a solid composite window of zero power.

However, as shown in FIG. 4(b), when one lens array is slightly translated with respect to the other via set screw 26, the axis of the optical system is angularly deflected due to the misalignment of the two lens array surfaces. Since the deflection created by concave to convex surfaces structures is opposite in sign to that created by convex to concave surfaces, the incident beam is split into two exiting beams. The magnitude of this splitting is therefore determined by the amount of translation.

The optical modulator 19 of the present invention can be made using molding techniques to create the lens arrays out of optical materials. Alternatively, instead of molding physical lens arrays on a modulator substrate, the lens arrays could be fabricated in the surface of a glass substrate, or by utilizing gradients of index of refraction or a holographic material integrated into the modulator substrate in accordance with known design principals to create the same light modifying characteristics as the lens arrays described above.

Further, while the present invention has been described and shown as utilizing a translating means such as set screw 26 so as to provide a tunable point spread function, the present invention could be alternatively implemented as a beam-splitter/modulator having a fixed point spread function simply by orienting the two lens arrays relative to each other in a fixed relationship at the time of manufacture.

Figure 5:
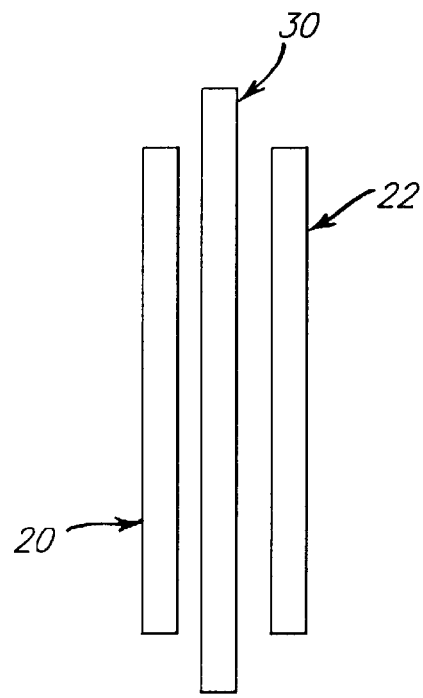
FIG. 5 is a side view of a two directional beam splitting arrangement in accordance with the present invention.
Figure 6:
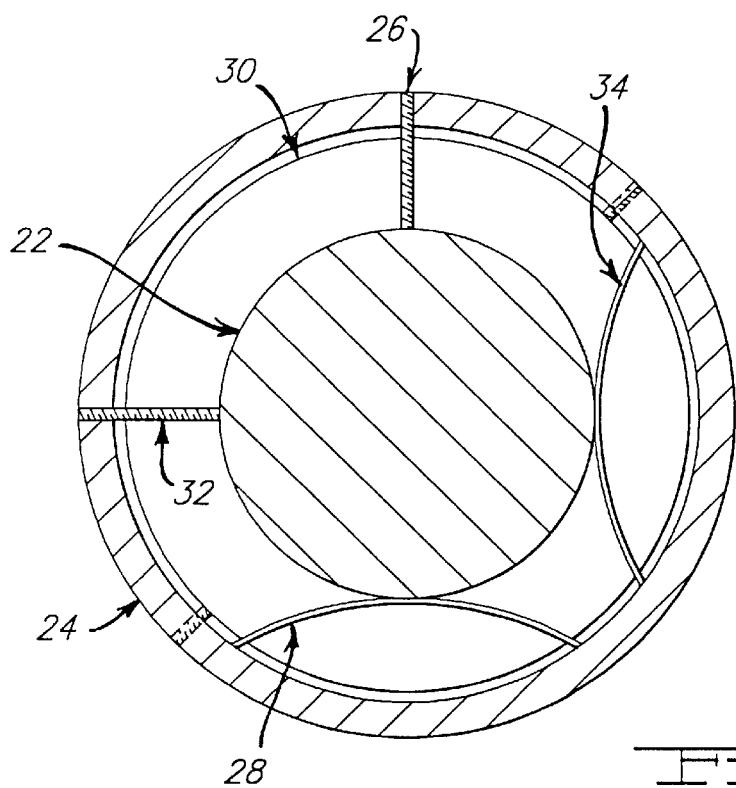
FIG. 6 is a front view of the modulator represented in FIG. 5.

In addition, as shown in FIGS. 5 and 6, if two fixed directions of splitting are desired instead of just one direction as described and shown above, then a stationary third optical element 30 having appropriate cylindrical structures formed on both sides thereof would be positioned between lens array 20 and 22, which both would be controllably moveable relative thereto. More specifically, both outer lenses would be provided with a set screw 26 arrangement such as described hereinabove so as to individually control translation in different respective orientations relative to the center element 30.

Further, a second set screw 32, tensioning wire 34, and notching can be provided with both outer lens arrays to permit adjustment of the angle between the center element 30 and the respective outer elements 20 and 22. Adjustment of the angle between an outer element and the center element allows the point spread function to be expanded or "stretched" linearly along a particular axis. If such stretching occurs along two orthogonal axes, than a rectangular or square point spread function would be created. Such an arrangement could also be utilized in conjunction with the single direction modulator shown in FIGS. 1–4.

Therefore, the present invention provides a thin, controllably variable beam splitter and optical modulator which is useful in many applications. Since the beam splitter is substantially afocal, it can be placed in many positions in a optical system with little restriction. In particular, the optical modulator of the present invention allows for precise tuning or adjustment of the point spread function of imaging system 10. By controllably tuning the point spread function of an imaging system, the present invention provides an optical modulator and method which increases image fidelity by precisely removing or altering artificial pixel or line structures in an optically formed image.

It will be understood that the foregoing description of the preferred embodiment(s) of the present invention is for illustrative purposes only, and that the various structural and operational features herein disclosed are susceptible to a number of modifications, none of which departs from the spirit and scope of the present invention as defined in the appended claims.

I claim:

1. A method for adjusting a point spread function of an imaging system comprising the steps of:

positioning an optical modulator along an optical axis of said imaging system, said optical modulator comprising a first and second optical element each having a lens array comprising alternating convex and concave light modifying structures formed on a surface thereof; and translating the orientation of the second optical element relative to the first optical element so as to controllably split any light passing through said modulator to create a modified point spread function for said imaging system.

2. The method of claim 1 wherein said translating step comprises tuning the point spread function by selectively adjusting the amount of translation.

3. The method of claim 2 wherein said translating step further comprises adjusting the amount of translation by manually adjusting a set screw.

4. In an imaging system, an optical modulator for modifying a point spread function of an optically formed image comprises:

a modulator assembly positioned along an optical axis of said imaging system comprising a first and second optical element each having at least a first lens array comprising alternating convex and concave light modifying structures formed on a surface thereof, wherein said light modifying structures are oriented relative to each other so as to split any incident light beam passing through said modulator assembly to create a desired point spread function.

5. The modulator of claim 4 further comprising means connected to said second optical element for selectively translating said second element relative to said first element so as to tune the point spread function.

6. The modulator of claim 5 wherein said means for selectively translating said second modulator element comprises a set screw.

7. The modulator of claim 4 wherein the alternating convex and concave light modifying structures of said first element and said second element each comprise a cylindrical structure having radii of identical magnitude.

8. The modulator of claim 4 wherein the alternating convex and concave light modifying structures of said first element and said second element are formed by utilizing gradients of index of refraction.

9. The modulator of claim 4 wherein the alternating convex and concave light modifying structures of said first element and said second element are formed by utilizing a holographic material.

10. The modulator of claim 4 further comprising a means connected for moving said second element to change an angle relative to the surface of said first element.

11. The modulator of claim 4 wherein said first optical element comprises a second lens array comprising alternating convex and concave light modifying structures formed on a second outer surface opposite the first lens array, and wherein said modulator further comprises a third optical element having a lens array comprising alternating convex and concave light modifying structures formed on an outer surface thereof, wherein said first and third optical element are positioned so that said second lens array of said first element and the lens array of said third element oppose each other, and said light modifying structures are oriented relative to each other so as to split any incident light beam passing through said modulator assembly in a different orientation from said first and second elements to create a desired point spread function in two axes.

12. The modulator of claim 11 further comprising a means connected to said third optical element for selectively translating said third element relative to said first element so as to tune the point spread function.

13. The modulator of claim 12 wherein said means for selectively translating said third element comprises a second set screw.

14. The modulator of claim 11 further comprising a means connected to at least said first or second element for moving said element to change an angle relative to the surface of said third element.

* * * * *